United States Patent [19]
Wibom

[11] Patent Number: 5,211,258
[45] Date of Patent: May 18, 1993

[54] AUXILIARY DEVICE FOR CONTROL OF VEHICLE STEERING DEVICE AND DRIVE UNITS

[75] Inventor: Gustaf Wibom, Solna, Sweden
[73] Assignee: Recodrive AB, Solna, Sweden
[21] Appl. No.: 741,538
[22] PCT Filed: Feb. 15, 1990
[86] PCT No.: PCT/SE90/00103
§ 371 Date: Aug. 13, 1991
§ 102(e) Date: Aug. 13, 1991
[87] PCT Pub. No.: WO90/09293
PCT Pub. Date: Aug. 23, 1990

[30] Foreign Application Priority Data

Feb. 16, 1989 [SE] Sweden .................. 89005433

[51] Int. Cl.⁵ .......... B60K 25/00; B60P 3/00; B62D 1/22
[52] U.S. Cl. .................. 180/275; 180/321; 180/333
[58] Field of Search .......... 180/319, 320, 321, 324, 180/65.2, 275, 277, 279

[56] References Cited

U.S. PATENT DOCUMENTS

| | | | |
|---|---|---|---|
| 659,078 | 10/1900 | Lieb | 180/277 |
| 1,984,830 | 12/1934 | Higley | 180/65.2 |
| 2,728,463 | 12/1955 | Beckwith | 180/324 |
| 2,761,569 | 9/1956 | Iserman | 180/324 |
| 3,059,716 | 10/1962 | Iserman et al. | 180/321 |
| 4,527,656 | 7/1985 | Walbridge | 180/321 |

FOREIGN PATENT DOCUMENTS

| | | |
|---|---|---|
| 2918438 | 11/1980 | Fed. Rep. of Germany . |
| 3200241 | 8/1983 | Fed. Rep. of Germany . |
| 1368801 | 10/1974 | United Kingdom . |
| 1369081 | 10/1974 | United Kingdom . |
| WO80/1154 | 6/1980 | World Int. Prop. O. . |

Primary Examiner—Karin L. Tyson
Attorney, Agent, or Firm—Sughrue, Mion, Zinn, Macpeak & Seas

[57] ABSTRACT

An auxiliary vehicle control device for maneuvering a vehicle (1) from a position other than the driver's position is disclosed which includes an operations unit (3) composed of an operating panel, a drive unit (40) and a control unit (23). The control unit (23) is mounted beneath the steering wheel (20) of the vehicle and coacts with the steering wheel (20) through a multi-disc clutch. The drive unit (40) is disposed in the region of the universal joint of the vehicle and coacts with a flange or collar on the output shaft of the gearbox, through a slip coupling arrangement. The front of the vehicle is equipped with a collision guard (50) which, when activated, is operative to activate devices, via operating devices, which apply one of the standard brake systems of the vehicle. The auxiliary vehicle control device can be fitted advantageously to many different types of vehicles.

7 Claims, 6 Drawing Sheets

AUXILIARY DEVICE FOR CONTROL OF VEHICLE STEERING DEVICE AND DRIVE UNITS

FIELD OF THE INVENTION

The present invention relates to an auxiliary vehicle control means by means of which a vehicle can be controlled from a site other than its driver's cabin location.

BACKGROUND ART

Vehicles of this kind are known in the art, as disclosed, for instance in WO A1 80/01154 (Wibom), and have been used, among other things, in conjunction with road maintenance work for the purpose of facilitating the formation of holes by the sides of the road under maintenance, for the erection of posts intended for road fencing, and the like.

Other examples of known vehicles of this kind are described and illustrated in GB A 1 368 801 and GB A 1 369 081 (both Steiner).

When the auxiliary vehicle control means is in use, the driver of the vehicle positions himself outside the driver's cabin and is able to control the vehicle, i.e., drive and steer the vehicle, from any desired position with the aid of an operations console or panel.

It is not necessary for the driver to return to the driver's cabin in order to move the vehicle through the short distance between two locations along the road where work is to take place.

DE A1 3 200 241 (Niklaus) describes an automatic control device—so-called autopilot—for a water craft or land based vehicle which is provided with a coupling device in the form of a helical spring which produces coupling engagement when the spring is extended as a result of being acted upon at either end. The coupling device is automatically disengaged when the standard control mechanism of the vehicle or watercraft is activated.

U.S. Pat. No. 4,527,656 (Walbridge) describes another known arrangement in which the vehicle lacks the provision of an auxiliary vehicle control means.

It has been found that improved auxiliary vehicle control means of the kind described enables the auxiliary vehicle control means to be used over a much wider field, therewith enabling the device to be used advantageously with a large number of different vehicles intended for mutually different purposes.

Accordingly, one object of the present invention is to provide auxiliary vehicle control means of the aforedescribed kind which will enable a vehicle to be maneuvered effectively and reliably from the alternative vehicle control site, and also to provide auxiliary vehicle control means which is compatible with the standard vehicle drive-and-control system and which will afford improved safety, for instance when the vehicle is to be driven in a direction which corresponds to its standard reverse-drive direction.

SUMMARY OF THE INVENTION

An auxiliary vehicle control means constructed in accordance with the invention and fulfilling this and other objects has the characteristic features described below.

Because the control and drive units coact with the steering rod and the vehicle drive-line respectively, via resiliently working means, the auxiliary vehicle control means will be superimposed operationally on the standard vehicle drive-and-control system, i.e., this latter system will be able to operate even when the auxiliary vehicle control means is engaged. By the term vehicle drive-line it is meant the series of vehicle drive components from the engine to the rear axle.

Thus, risks and inconveniences are avoided, such as in the event of the driver inadvertently engaging the auxiliary vehicle control means when the vehicle is being driven normally. In this latter case, the vehicle can still be steered with the aid of the vehicle steering wheel, even though steering will be slightly heavier in this situation.

Another important advantage afforded by the invention is that the standard vehicle drive-and-control system need not be reconstructed or modified to any great extent. Instead, the auxiliary vehicle control means can be fitted to the vehicle without needing to disturb the standard vehicle drive-and-control system to any great extent, this system thus remaining essentially unchanged.

The front of the vehicle will preferably be fitted with a collision guard.

This collision guard provides additional safety when the driver moves the vehicle forwards from the alternative vehicle control site, particularly when this is designed to render driving of the vehicle in reverse safer. In many cases, the vision ahead is unsatisfactory when driving the vehicle in a forward direction, and the provision of a collision guard of the aforedescribed kind will thus have a safety promoting factor. It is highly important that people who see a moving vehicle with no driver in the driver's cabin are able to observe the presence of a driver at the alternative vehicle control site.

With an arrangement of this kind, safety can be enhanced when, activation of the collision guard will result in disengagement of the drive unit of the auxiliary vehicle control means, this drive unit being brought to a stop. The control unit is constructed to retain its control function.

Because a moving vehicle has a large total mass, the vehicle will have a given braking distance, even when the collision guard is activated. Consequently, an advantage is afforded when the driver is able to steer and control the vehicle throughout the extent of this braking distance.

The aspect of safety when driving a vehicle forward can also be improved by mounting a TV-camera on the forward part of the vehicle and providing the alternative operating location with a TV-monitor by means of which the driver is able to utilize the information observed by the TV-camera.

The arrangement of a control unit transmission means mechanically coupled with a steering rod, will enable the various units incorporated in the auxiliary vehicle control means to be activated readily from the driver's cabin. The above coupling is effected by the driver of the vehicle with the aid of a device, such as the operating lever, whereby the driver is able to leave the driver's cabin and position himself at the alternative operating location, so as to obtain full control over the vehicle through the operating unit of said auxiliary vehicle control means, subsequent to having manipulated the main current switch on the operations panel or console.

A particularly operable construction of the control unit forming part of the auxiliary vehicle control means is also provided. In this embodiment, the control unit will only occupy a small space in the driver's cabin and can be fitted to the steering wheel in a simple fashion. The aforesaid operating lever is readily accessible to the driver.

The friction clutch or coupling ensures that the driver is able to steer the vehicle by means of the steering wheel, even though the auxiliary vehicle control means should be unintentionally engaged. In this case, however, considerable on the part of the driver will be needed to steer the vehicle.

Important advantages are afforded when a drive-unit transmission means is combined with a drive shaft of a vehicle, wherein the drive unit is protected to the greatest possible extent against the effect of vibrations and shaking, which have the smallest amplitudes when mounted at the position mentioned.

Uneven loading of the driving shaft can be avoided by using at least two motors with the drive unit, and it is also possible to obtain two mutually different operational states in a simple fashion, by coupling the motors alternatively in series or in parallel.

The drive unit will preferably include a slip coupling in order to avoid damage to the drive shaft, for instance, should the drive unit be inadvertently engaged as the vehicle is moved forward with the aid of its standard drive line.

A slip coupling will also ensure that when braking or releasing the "dead man's grip", the drive unit is able to slip relative to the drive line to a sufficient extent. The drive-unit motors may be electric motors or hydraulic motors. When hydraulic motors are used, the aforesaid slipping function can be achieved with the aid of an appropriate check valve arrangement.

A pressure-fluid activated coupling arrangement, preferably a pneumatic coupling arrangement, can be used for engaging the gearwheels of the drive unit, said gearwheels preferably being displaceable on splines provided on the outward shafts of respective drive motors.

The inventive auxiliary vehicle control means can find use in many different types of vehicles, for instance garbage collection vehicles, aircraft catering vehicles, so-called sky-lifts, and road maintenance vehicles, such as a hedge-clipping vehicle, a timber loader, an asphalt layer, a vehicle for setting-out verge markers on snowy roads, a road salvage vehicle or other types of crane-carrying vehicles, etc. It will be seen from the above that the inventive auxiliary vehicle control means has a particularly wide range of use possibilities.

The invention will now be described in more detail with reference to exemplifying embodiments thereof illustrated in the accompanying schematic drawings.

BEST MODES OF CARRYING OUT THE INVENTION

Figure 1:
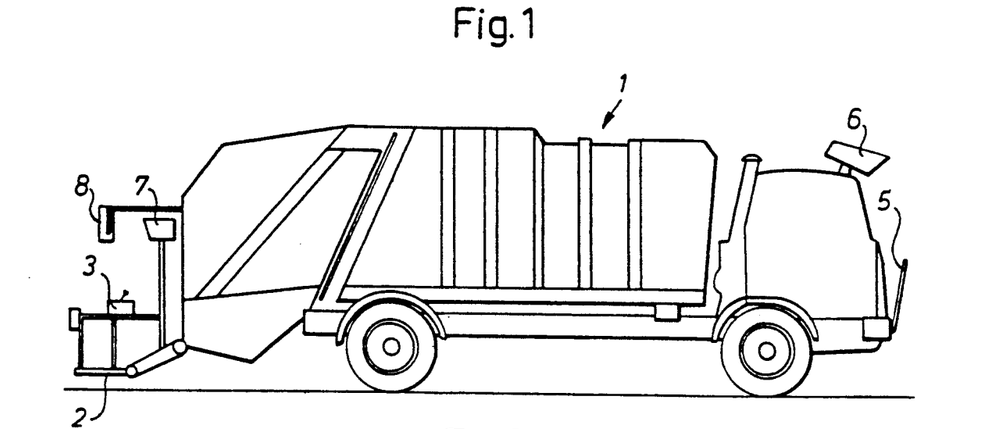
FIG. 1 is a side view of a refuse collection truck provided with an auxiliary vehicle control means according to the invention.

FIG. 1 illustrates a refuse collection vehicle 1 which has mounted on its rear end an operations bridge as platform 2 on which the driver of the vehicle can position himself and, while facing in the rearward direction of the vehicle, maneuver the vehicle with the aid of an inventive auxiliary vehicle control means.

In the case of the FIG. 1 illustration, it is assumed that the driver faces in the direction in which the vehicle is to be driven, i.e., in reverse. In other words, when using the inventive auxiliary vehicle control means, the driver will stand facing in the opposite direction to the direction in which the vehicle normally moves (i.e., forwards).

Figure 2:
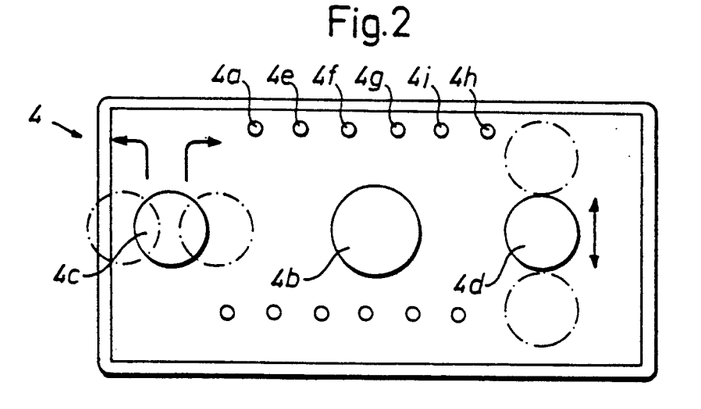
FIG. 2 is a top view illustrating an operations panel or console forming part of the operating units of the auxiliary vehicle control means.

The auxiliary vehicle control means is operated with the aid of an operating unit 3 equipped with an operations console or panel 4, illustrated in FIG. 2.

The vehicle is also provided with a front collision guard, in the form of a grid or like construction 5, and a TV-camera 6 which scans the area in front of the vehicle driver's cabin, a monitor 7 which is connected to the TV-camera and which enables the driver, while on the bridge or platform 2, to obtain the information observed by the TV-camera 6. The platform 2 also carries two rear-view mirrors 8, so that the driver is able to see respective areas on both sides of the vehicle when driving the vehicle with the aid of said auxiliary vehicle control means.

The operations console 4 on the operating unit 3 incorporates, among other things, the following operating means: a main electric supply switch 4a; an emergency stop switch 4b; and control means 4c operative to steer the vehicle in one direction or the other, by engagement of the control unit incorporated in the auxiliary vehicle control means. Also provided is a control means 4d for driving the vehicle forwards or backwards, by engagement of said drive unit in one or the other direction.

The console or panel 4 also includes two buttons 4e, 4f for activation of a drive direction indicator, means 4g for activating a hand brake, a signal button 4h and a means 4i for engaging and disengaging the vehicle brake system.

The vehicle driver's cabin is also equipped with control means for engaging and disengaging, among other things, electrical supply, drive unit, control unit, brakes, light signals, and acoustic signals (e.g., horn) when driving forwards (not shown).

Figure 3:
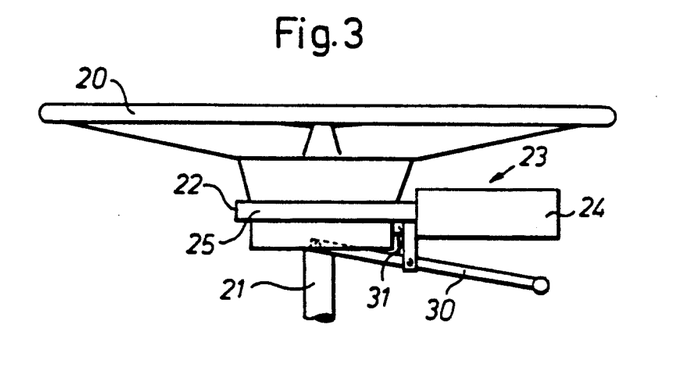
FIG. 3 is a side view of a control unit forming part of the auxiliary vehicle control means and connected to the steering wheel of the vehicle.
Figure 4:
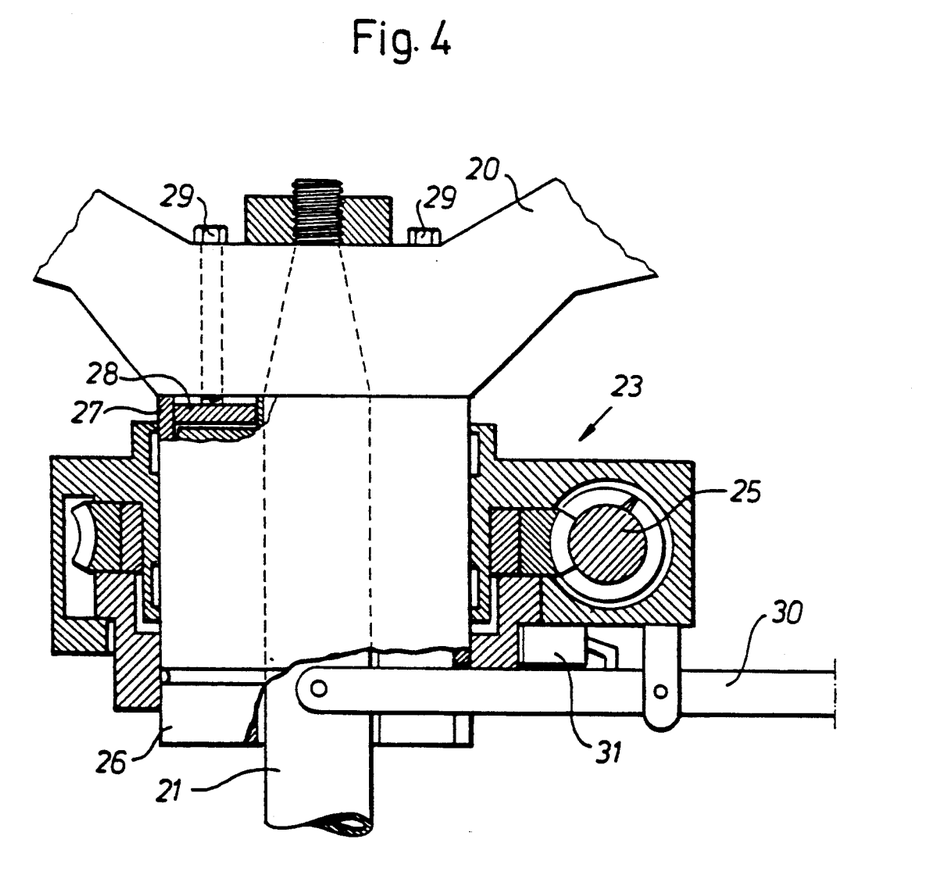
FIG. 4 is a sectional view of the control unit illustrated in FIG. 3.

FIGS. 3 and 4 illustrate the vehicle steering wheel 20, connected to a steering rod 21 which is surrounded by a sleeve 22 and connected to a control unit 23 forming part of the inventive auxiliary vehicle control means.

The control unit includes an electric motor 24 provided with a worm gear 25 and a multiple disc clutch 26 (friction coupling means) which surrounds the steering rod 21 and the sleeve 22. The disc clutch 26 has a driving part 27 and a driven part 28, this latter part being joined to the steering wheel 20 with the aid of screws 29.

When fitting the control unit, the steering wheel 20 is removed from the steering rod 21 and said control unit 23 is then fitted onto the steering wheel and the steering wheel then refitted to the steering rod.

The control unit is activated by means of a lever 30, which when moved downwards activates a microswitch 31 which functions to engage the drive circuit of the auxiliary vehicle control means, i.e., so that the drive unit will also be engaged when the main switch 4a on the console 4 is switched on. The reference numeral 50 in FIG. 5b identifies the gearbox of the vehicle. The output shaft 51 of the gearbox has a flange or collar 52 provided with teeth 52a. The universal joint is referenced as numeral 53.

Figure 5A:
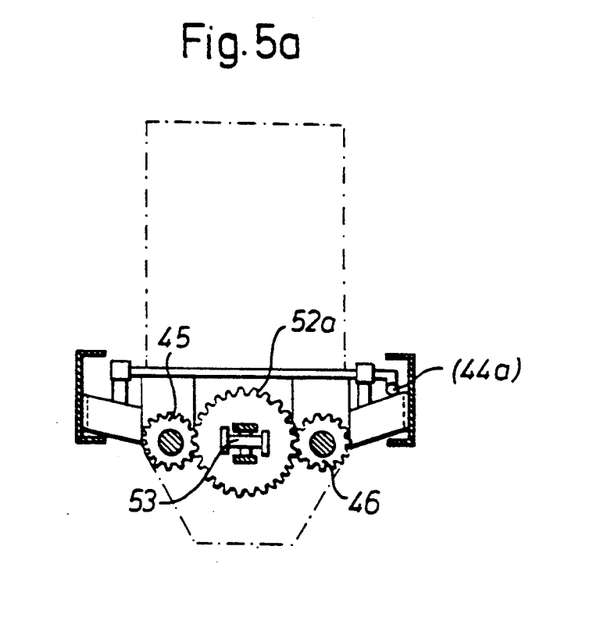
FIGS. 5a and 5b are views of a drive unit forming part of the auxiliary vehicle control means and connected to the drive shaft of the vehicle.
Figure 5B:
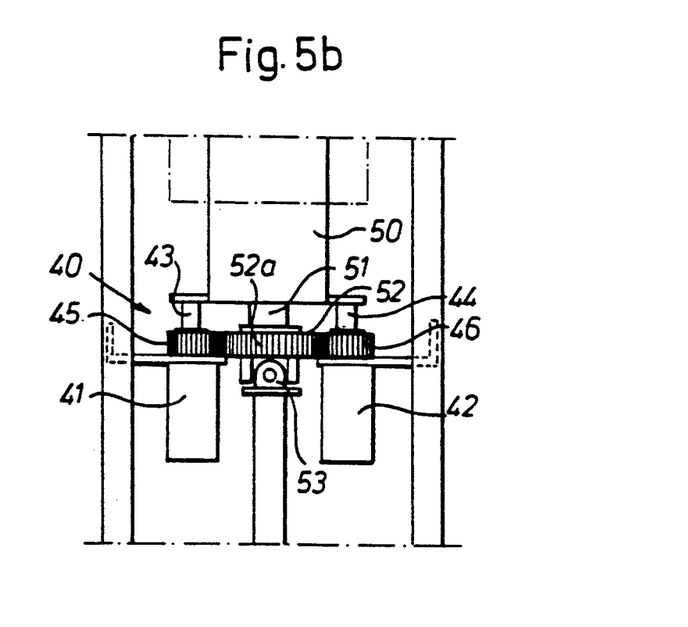

The drive unit 40 of the illustrated auxiliary vehicle control means comprises two motors 41 and 42, which may coact in parallel or in series in a manner to provide two mutually different operational states of the drive unit.

The output shaft 43, 44 of respective motors 41, 42 have gearwheels 45, 46 which can be displaced on the shafts 43, 44 by means of coupling devices in the form of pneumatic piston-cylinder assemblies (not shown).

Because the drive unit 40 is positioned in the region of the universal joint 53, the amplitudes of occurrent vibrations, and therewith the stresses on the drive unit, will be relatively small.

In accordance with one important feature of the invention, the drive unit includes resiliently operating devices, e.g., in the form of a slip coupling, which will not lock the drive shaft should the drive unit be disengaged, for instance if the power delivered to the drive unit is brought to zero or interrupted in some other way. Alternatively, an electronic arrangement can be used to this end.

A vehicle of the kind concerned will have a very large mass, and therefore have a risk that the components of the drive unit will be damaged if the aforesaid resiliently working arrangement is omitted.

The motors 41, 42 of the drive unit 40 also have coupling devices operative to displace respective gearwheels 45, 46 on splines on the shaft 43 and 44 respectively and functioning to disengage automatically upon activation of a corresponding operating button or when the auxiliary vehicle control means is disengaged so that the vehicle can be driven in a conventional manner.

Figure 6:
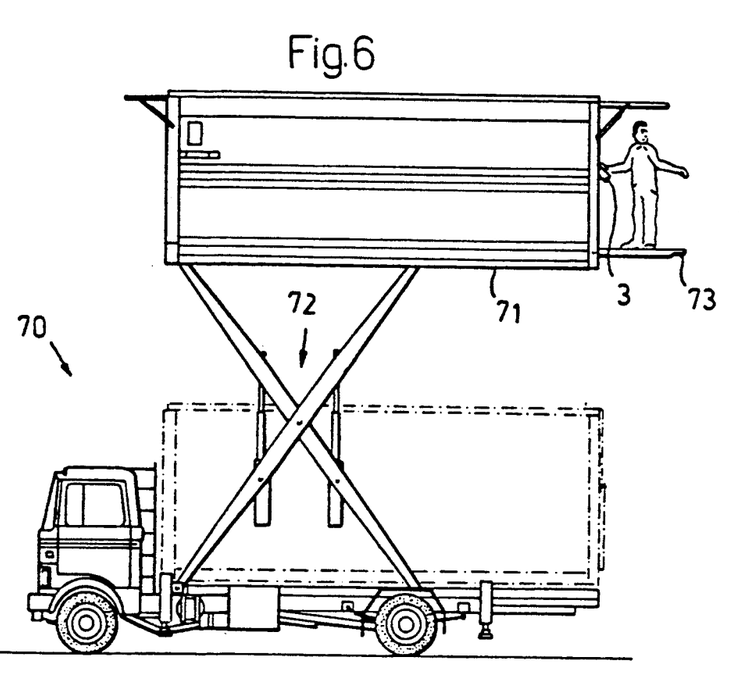
FIG. 6 is a side view of a catering vehicle for aircraft catering on airfield complexes using an auxiliary vehicle control means according to the present invention.
Figure 7:
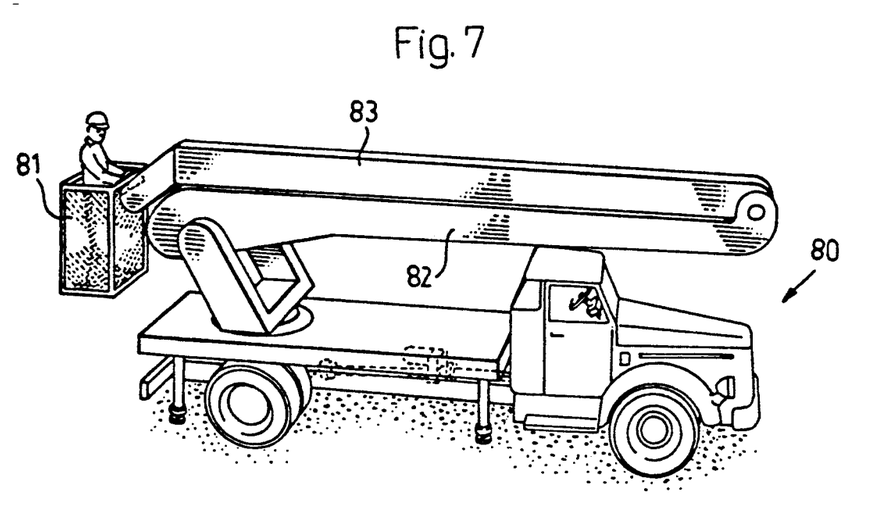
FIG. 7 is a perspective view of a so-called sky-lift using an auxiliary vehicle control means according to the present invention.
Figure 8:
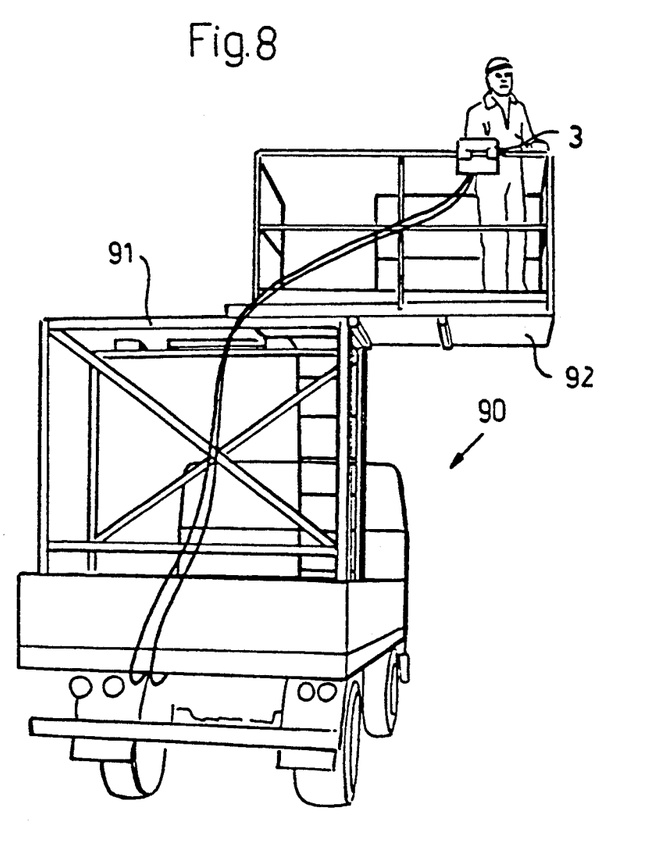
FIG. 8 is a perspective view of a road maintenance vehicle or like vehicle, more specifically a hedge clipping vehicle using an auxiliary vehicle control means according to the present invention.

FIGS. 6-8 illustrate further examples of vehicles with which an inventive auxiliary vehicle control means can be used.

Thus, FIG. 6 illustrates a so-called aircraft catering vehicle 70. The platform part 71 of the vehicle can be raised and lowered by means of a hydraulically-driven pantograph arrangement 72.

The rear of the vehicle is equipped with a collapsible operations bridge or a platform 73, on which the driver of the vehicle can take position and, while facing in the direction of movement of the vehicle, can reverse the vehicle towards an aircraft (not shown) with the aid of the operating unit 3, so as to enable the aircraft to be loaded or unloaded. This affords the advantage of enabling the driver to face towards the aircraft and approach said aircraft carefully. Consequently, the considerable drawbacks of earlier known catering vehicles in which the driver is located at the other end of the platform is eliminated.

FIG. 7 illustrates a so-called sky-lift 80, in which the driver stands in a basket 81 at one end of a two-part lifting arrangement 82, 83. The driver is able to drive and steer the vehicle from a raised basket position.

FIG. 8 illustrates a maintenance vehicle 90, more specifically a vehicle for clipping or cutting high hedges. The vehicle is equipped with a frame 91 which carries a laterally movable platform 92, from which the vehicle can also be driven and controlled through the operating unit 3.

Figure 9:
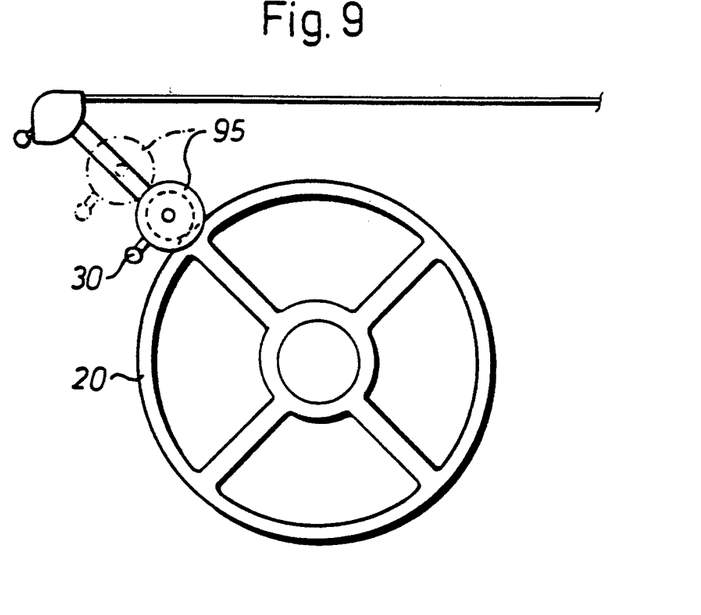
FIGS. 9 and 10, illustrate a modified control unit.
Figure 10:
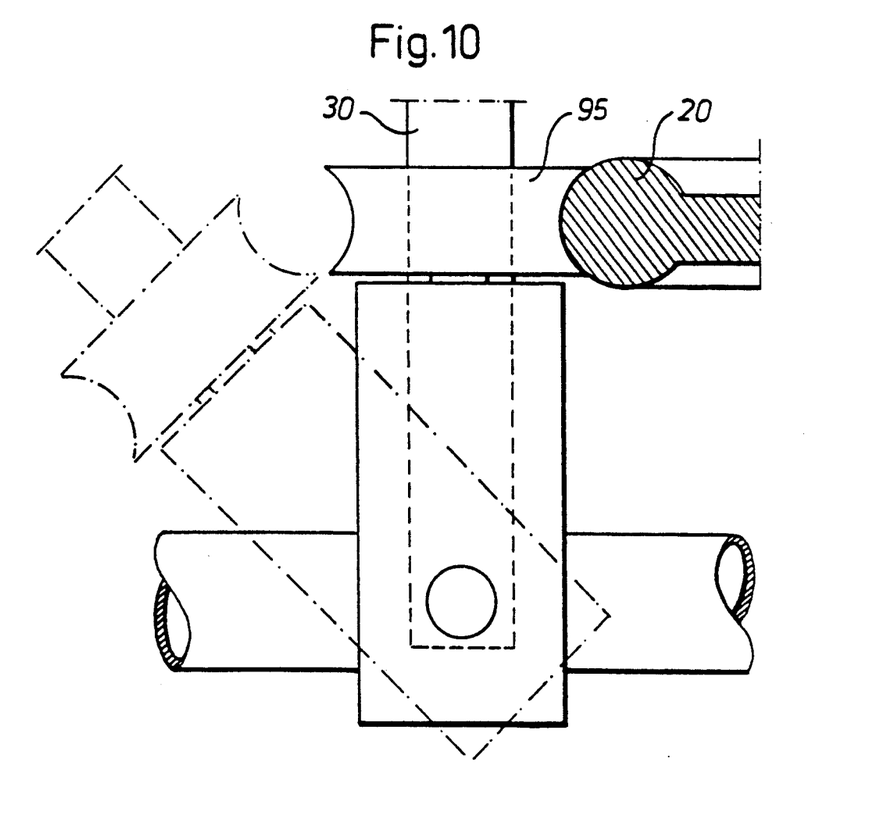

FIGS. 9 and 10 illustrate a modified control unit. This unit includes spring-mounted drive wheel 95 which can be engaged and disengaged by means of a lever 30. The control unit is preferably mounted on a door post closest to the steering wheel in the driver's cabin. The drive wheel 95 is driven by an electric or a hydraulic motor 24. The steering wheel is activated to steer the vehicle, by frictional engagement between the drive wheel 95 and the outer peripheral surface of the steering wheel 20. The drive wheel also functions as a coupling or clutch means, the engagement force of which can be adjusted so as to enable the steering wheel to be influenced by the driver to steer the vehicle with the aid of the steering wheel, even when the control unit is in operation.

As will be evident from the aforegoing, an inventive auxiliary vehicle control means can be used with many other types of vehicle, such as a timber loader, asphalt layer, vehicles for setting-out verge-indicators on snowy roads, salvage vehicles and other types of crane-carrying vehicles. Many other applications are also conceivable.

I claim:

1. An auxiliary vehicle control device for maneuvering a vehicle by manipulating a standard control unit, which comprises a vehicle steering rod used to control the operation of the vehicle when a driver is in the vehicle's driver's seat, and by manipulating a standard drive unit, which comprises a drive shaft used to drive the vehicle in a desired direction, from a vehicle control position other than the driver's seat, said auxiliary vehicle control device comprising:

a) a first motor for manipulating the vehicle steering rod, said first motor being operatively engaged with said steering rod by a first resilient coupling means, wherein said first resilient coupling means comprises a gear operatively engaged with a friction clutch surrounding the steering rod, thereby coupling said first motor with the steering rod, said friction clutch being mounted beneath the steering wheel;

b) a second motor for manipulating the vehicle drive shaft, said second motor being operatively engaged with said drive shaft by a second resilient coupling means; and c) an operations panel for controlling said first and second motors so that the vehicle can be driven and maneuvered by means of the vehicle's standard control and drive units, wherein said standard control and drive units may also be used by a driver in the driver's seat to maneuver the vehicle even when said first and second motors are operatively engaged.

2. An auxiliary vehicle control device according to claim 1, further comprising a collision guard fitted to the front of the vehicle, wherein when said collision guard is subjected to collision, said collision guard is operative to activate a braking system of the vehicle and disengage said second motor, without disengaging said first motor.

3. An auxiliary vehicle control device according to claim 2, wherein said first resilient coupling means comprises engaging means for mechanically coupling together said first motor with the steering rod, said engaging means, upon activation, for activating the drive unit and collision guard via electric operating circuits.

4. An auxiliary vehicle control device for maneuvering a vehicle by manipulating a standard control unit, which comprises a vehicle steering rod used to control the operation of the vehicle when a driver is in the vehicle's driver's seat, and by manipulating a standard drive unit, which comprises a drive shaft used to drive the vehicle in a desired direction, from a vehicle control position other than the driver's seat, said auxiliary vehicle control device comprising:
   a) a first motor for manipulating the vehicle steering rod, said first motor being operatively engaged with said steering rod by a first resilient coupling means which is coupled to said steering rod;
   b) a second motor for manipulating the vehicle drive shaft, said second motor being operatively engaged with said drive shaft by a second resilient coupling means, wherein said second resilient coupling means engages the drive shaft of the vehicle at a location on a driveline behind a gearbox of the vehicle, said second resilient coupling means engaging a toothed or flanged collar on an output shaft of said gearbox;
   c) an operations panel for controlling said first and second motors so that the vehicle can be driven and maneuvered by means of the vehicle's standard control and drive units, wherein said standard control and drive units may also be used by a driver in the driver's seat to maneuver the vehicle even when said first and second motors are operatively engaged; and
   d) a third motor provided for manipulating the vehicle drive shaft, said second and third motors having shafts which carry gearwheels for meshing engagement with the flange or collar.

5. The auxiliary control device according to claim 4, further comprising a collision guard fitted to the front of the vehicle, wherein when said collision guard is subjected to collision, said collision guard is operative to activate a braking system of the vehicle and disengage said second motor, without disengaging said first motor.

6. The auxiliary control device according to claim 5, wherein said first resilient coupling means comprises engaging means for mechanically coupling together said first motor with the steering rod, said engaging means, upon activation, for activating the drive unit and collision guard via electric operating circuits.

7. The auxiliary control device according to claim 6, wherein said first resilient coupling means comprises a friction-coupling means for applying friction force to operatively engage said first motor with the steering rod, said friction-coupling means being mounted beneath the steering wheel.

* * * * *